Feb. 20, 1923.
T. E. MURRAY, Jr., ET AL.
POLE CARRYING RING FOR ELECTRIC APPARATUS.
FILED APR. 6, 1921.
1,445,640.
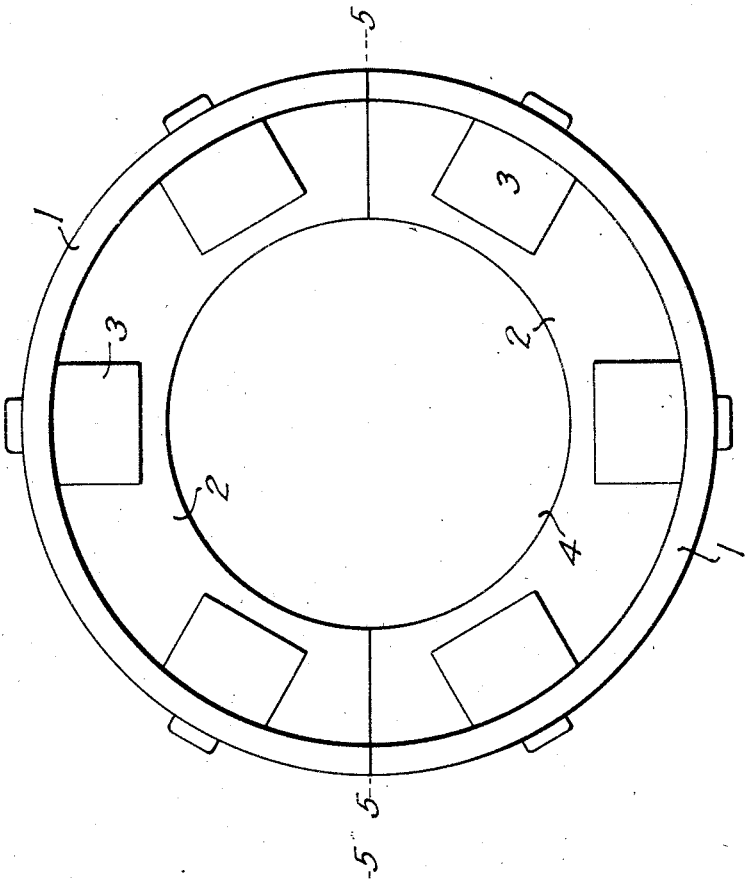
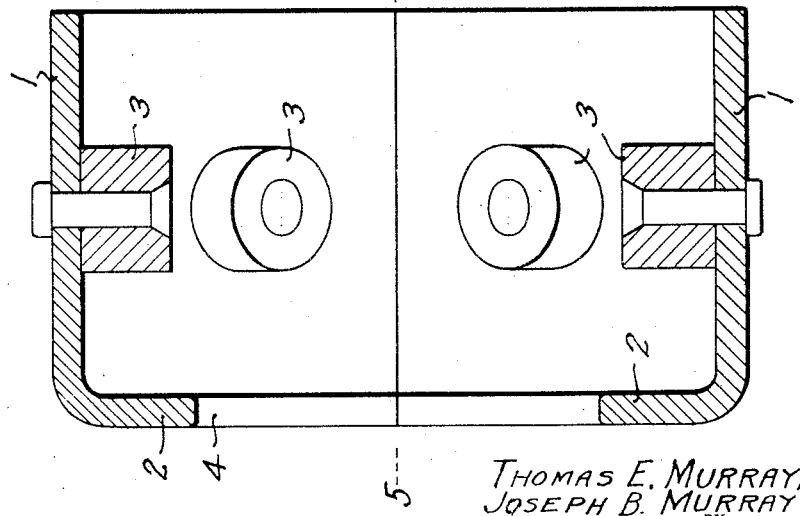
INVENTORS
THOMAS E. MURRAY, Jr.
JOSEPH B. MURRAY
BY
, ATTORNEY Patented Feb. 20, 1923.

1,445,640

UNITED STATES PATENT OFFICE.

THOMAS E. MURRAY, JR., AND JOSEPH B. MURRAY, OF BROOKLYN, NEW YORK.

POLE-CARRYING RING FOR ELECTRIC APPARATUS.

Application filed April 6, 1921. Serial No. 458,895.

*To all whom it may concern:*

Be it known that we, THOMAS E. MURRAY, Jr., and JOSEPH B. MURRAY, citizens of the United States, and residents of Brooklyn, county of Kings, and State of New York, have invented certain new and useful Improvements in Pole-Carrying Rings for Electric Apparatus, of which the following is a specification.

Our inventions aims to provide an improved pole-carrying ring for electric generators, motors, etc., by which rings can be made economically of a desired weight and composition of iron, steel or the like.

The accompanying drawings illustrate an embodiment of our invention.

Fig. 1 is an end elevation and Fig. 2 a vertical section.

Such rings comprise drum or cylindrical portions 1 entirely open at one end and formed with an inward flange 2 at the opposite end. They may also be made of various proportions and designs other than that shown. On the inside of the drum, pole pieces 3 are fastened at intervals in any usual or suitable way, such pole pieces and their method of attachment constituting no part of our invention.

The commonest way of making these rings has been by drawing them from sheet metal in the form of a deep cup and cutting an opening 4 in the lower end in order to leave a flange 2 of desired width. This is a deep drawing operation and requires metal which is comparatively thin and of high quality and great ductility. It is desirable, in many cases, to use heavier metal or metal of more brittle or less ductile quality such for example as high silicon, low hysteresis, steel, but such rings cannot be made economically by the deep drawing process described.

According to our invention, however, metal of comparatively great thickness can be used and also metal which is comparatively brittle. Segments of the desired weight and composition are drawn separately. The drawing operation is much less expensive than with the old method. The segments can then be quickly and cheaply united to each other to form the complete ring.

In the example shown the ring is made in two identical segments with their edges on the axial plane 5—5, each segment comprising half of the drum and half of the flange (with a slight excess to allow for extrusion in welding operations). The segments are then pressed together with their edges in contact and butt welded along such edges. Preferably the welding is done electrically, pressing the two parts together between electrodes suitable for the purpose and passing a current of very high amperage across the joint for a very brief interval of time. This operation can be performed with great accuracy, producing a ring which is perfect in shape and which can be made of practically any weight and composition desired. The flash or fin of extruded metal formed along the joint may be cut or ground away or removed.

The pole pieces 3 may be applied either before or after the uniting of the segments.

Pole-carrying rings are in some cases made without the inward flange 2. Rings of this design are made from seamless tubing, machined down to the accurate dimensions required. But it is also impracticable to produce such flangeless rings of the low hysteresis steel which is most desirable for such purpose. Such steel contains a high percentage of silicon, up to about five per cent, and is specially heat-treated. It is known as "Hadfield" steel and is of exceptionally great value in reducing hysteresis losses in electrical apparatus. Our invention contemplates the use of this low hysteresis steel for rings, either flanged or not, made up in segments and welded as described.

Though we have described with great particularity of detail a certain embodiment of our invention, yet it is not to be understood therefrom that the invention is restricted to the particular embodiment disclosed. Various modifications thereof in detail and in the arrangement of the parts may be made by those skilled in the art without departure from the invention as defined in the following claims.

What we claim is:

1. A pole-carrying ring for electric generators, motors and the like, composed of segments of stamped sheet metal and having their edges parallel to the axis, said segments being welded together along said edges, in combination with pole pieces fastened at intervals around said ring.

2. A pole-carrying ring for electric generators, motors and the like, comprising a drum with an inward flange at one end, said ring being composed of segments of stamped sheet metal and having their edges parallel to the axis, said segments being welded together along said edges.

3. A pole-carrying ring for electric generators, motors and the like, comprising a drum with an inward flange at one end, said ring being composed of two identical segments of stamped sheet metal, each including one half of the drum and one half of the flange and having its edges parallel to the axis, said segments being butt-welded to each other along said edges.

4. A pole-carrying ring for electric generators, motors and the like, composed of stamped segments of high-silicon, low hysteresis, steel and having their edges parallel to the axis, said segments being welded together along said edges.

5. The method of manufacture of pole-carrying rings for electric generators, motors and the like which consists in stamping sheet metal in the form of segments of such a ring with edges parallel to the axis and uniting said segments by welding along the said edges.

6. The method of manufacturing pole-carrying rings for electric generators, motors and the like in the form of a drum with an inward flange at one end, which consists in stamping sheet metal in the form of segments of such a drum with edges parallel to its axis and uniting such segments by welding them together along the said edges.

In witness whereof, we have hereunto signed our names.

THOMAS E. MURRAY, Jr.
JOSEPH B. MURRAY.